United States Patent [19]
Degnan et al.

[11] Patent Number: 5,293,243
[45] Date of Patent: Mar. 8, 1994

[54] IMAGE SPLITTER FOR SECURITY CAMERAS

[76] Inventors: Donald E. Degnan, 314 E. 77th St., New York, N.Y. 10021; Howard A. Schaad, 490 S. Soangepaha Rd., Galesbury, Ill. 61401

[21] Appl. No.: 871,440

[22] Filed: Apr. 21, 1992

[51] Int. Cl.$^5$ ............................ H04N 7/18; G02B 5/08
[52] U.S. Cl. ............................ 348/369; 359/855; 348/373
[58] Field of Search ............ 358/226, 225, 229; 352/65, 69; 354/225, 115, 117, 122, 95; 359/855, 471, 477

[56] References Cited

U.S. PATENT DOCUMENTS

| | | | |
|---|---|---|---|
| 1,334,810 | 3/1920 | Smith | 359/855 |
| 2,109,586 | 3/1938 | Einbinder | 359/855 |
| 2,261,940 | 11/1941 | Palmer | 359/855 |
| 3,254,933 | 6/1966 | Latulippe | 352/62 |
| 3,546,378 | 12/1970 | Karikawa | |
| 3,610,825 | 10/1971 | Fritzel | |
| 3,634,622 | 1/1972 | Wheeler | |
| 3,900,243 | 8/1975 | Johnson | |
| 3,952,217 | 4/1976 | Rawlings | |
| 4,024,733 | 5/1977 | Carnes | |
| 4,047,792 | 9/1977 | Dale, Jr. et al. | |
| 4,058,831 | 11/1977 | Smith | |
| 4,266,847 | 5/1981 | Menke | |
| 4,326,218 | 4/1982 | Coutta et al. | 358/229 |
| 4,364,000 | 12/1982 | Burke, Jr. | |
| 4,410,233 | 10/1983 | Gerhardt et al. | |
| 4,437,745 | 3/1984 | Hajual | 354/117 |
| 4,499,490 | 2/1985 | Morgan | |
| 4,750,486 | 6/1988 | Butler et al. | |
| 4,792,198 | 12/1988 | Sherwood | |
| 4,941,739 | 7/1990 | Grudic et al. | |

FOREIGN PATENT DOCUMENTS 2103824A 2/1983 United Kingdom .

*Primary Examiner*—Jon W. Henry
*Attorney, Agent, or Firm*—Hedman, Gibson & Costigan

[57] ABSTRACT

Disclosed is an apparatus for providing a pair of images to a fixed security camera, the apparatus comprising an angled mirror assembly comprising a left mirror and a right mirror joined at an edge therebetween and disposed at an angle between approximately 60° and 120°, preferably 90°, to each other. The mirrors are mounted on the angled mirror assembly such that images transmitted through each of a pair of windows of a housing are reflected by the mirrors towards a camera assembly, and the mirrors are bevelled at a joining edge such that no image is generated from the area within and between the respective surfaces thereof. As a result, a left image incident upon the left mirror is reflected thereby towards the camera, and a right image incident upon the right mirror is reflected thereby towards the camera, and the resultant image captured by said camera is composed of a split image of the left image and the right image.

4 Claims, 9 Drawing Sheets

IMAGE SPLITTER FOR SECURITY CAMERAS

FIELD OF THE INVENTION

The present invention relates generally to video surveillance systems, and in particular to the use of a pair of mirrors fixed at a predetermined angle in relation to the lens of a television security camera to provide simultaneously a fixed split image of an area under surveillance thereto.

BACKGROUND OF THE INVENTION

In the field of video surveillance, it is desired to provide the maximum amount of surveillance of the secured area with the minimum amount and complexity of security camera equipment. Television security cameras are often mounted in fixed positions at locations which provide the greatest possible viewing area per camera. When corridors intersect, it is common practice to install two or more cameras in fixed positions at the intersection, with each camera pointed towards a different corridor. In addition, when a long corridor must be monitored, it is common to utilize multiple cameras in fixed positions at various points thereof.

In order to monitor each of the images from the various cameras, it is necessary to provide means for switching from the image provided by one camera to the next. Alternatively, multiple video monitors can be used, corresponding to the number of cameras in the system. Both these methods of monitoring the large number of images provided by the various fixed point cameras are, however, costly.

An alternative way to provide greater coverage is to provide a security camera with means for panning the area under surveillance, rather than fixing the camera in one position. To accomplish this, servo motor drive assemblies are implemented with automatic pan or remote control mechanisms. Typically, a security guard located at a strategically located guard station will operate such remote control devices.

In addition, numerous devices exist in the prior art which operate to move assemblies of mirrors and prisms in order to provide a fixed position security camera with greater surveillance capability. Such mechanisms are also costly and must be aligned and serviced in order to maintain the needed reliability.

Although the use of automatic or semi-automatic drive assemblies enables the reduction of the number of security cameras and corresponding monitors, such assemblies are costly to install and maintain. Moreover, the chance of failure of mechanical panning devices is considerably detrimental in high security applications. Further, the use of such prior art techniques provide only one view for transmission to a monitor at any given time.

Accordingly, it is an object of the present invention to provide video surveillance of a large area with minimal cost and chance of failure.

It is a further object of the present invention to enable a security camera to monitor optical images from two directions simultaneously, thus eliminating the need for mechanical devices which scan areas of a geometrical size too large or of too complex a structure for one security camera to capture.

It is a further object of the present invention to provide an attachment for a standard commercially available security camera to generate separate images of different areas for simultaneous display on a standard commercially available monitor without additional electronic modifications thereto.

SUMMARY OF THE INVENTION

In accordance with these and other objects, the present invention is an apparatus for providing a pair of images to a fixed security camera. The apparatus has a housing, a platform slidably engaged within the housing, a camera assembly, and an angled mirror assembly comprising a pair of mirrors. The housing has a pair of windows situated on opposite sides thereof. The camera assembly comprises a camera mounting block, a camera and a lens, with the camera mounting block comprising a ring threaded on a first side for coupling to the mount of the camera and threaded on a second side for coupling to the lens and a plurality of tabs for attaching the ring to the mounting block. The angled mirror assembly has a pair of mirrors comprising a left mirror and a right mirror joined at an edge therebetween and disposed at an angle between approximately 60° and 120°, preferably 90°, to each other. The mirrors are mounted on the angled mirror assembly such that images transmitted through each of the windows of the housing are reflected by the mirrors towards the camera, and the mirrors are bevelled at the joining edge such that no image is generated from the area within and between the respective surfaces thereof. As a result, a left image incident upon the left mirror is reflected thereby towards the camera, and a right image incident upon the right mirror is reflected thereby towards the camera, and the resultant image captured by said camera is composed of a split image of the left image and the right image.

DESCRIPTION OF THE PREFERRED EMBODIMENT

Figure 1:
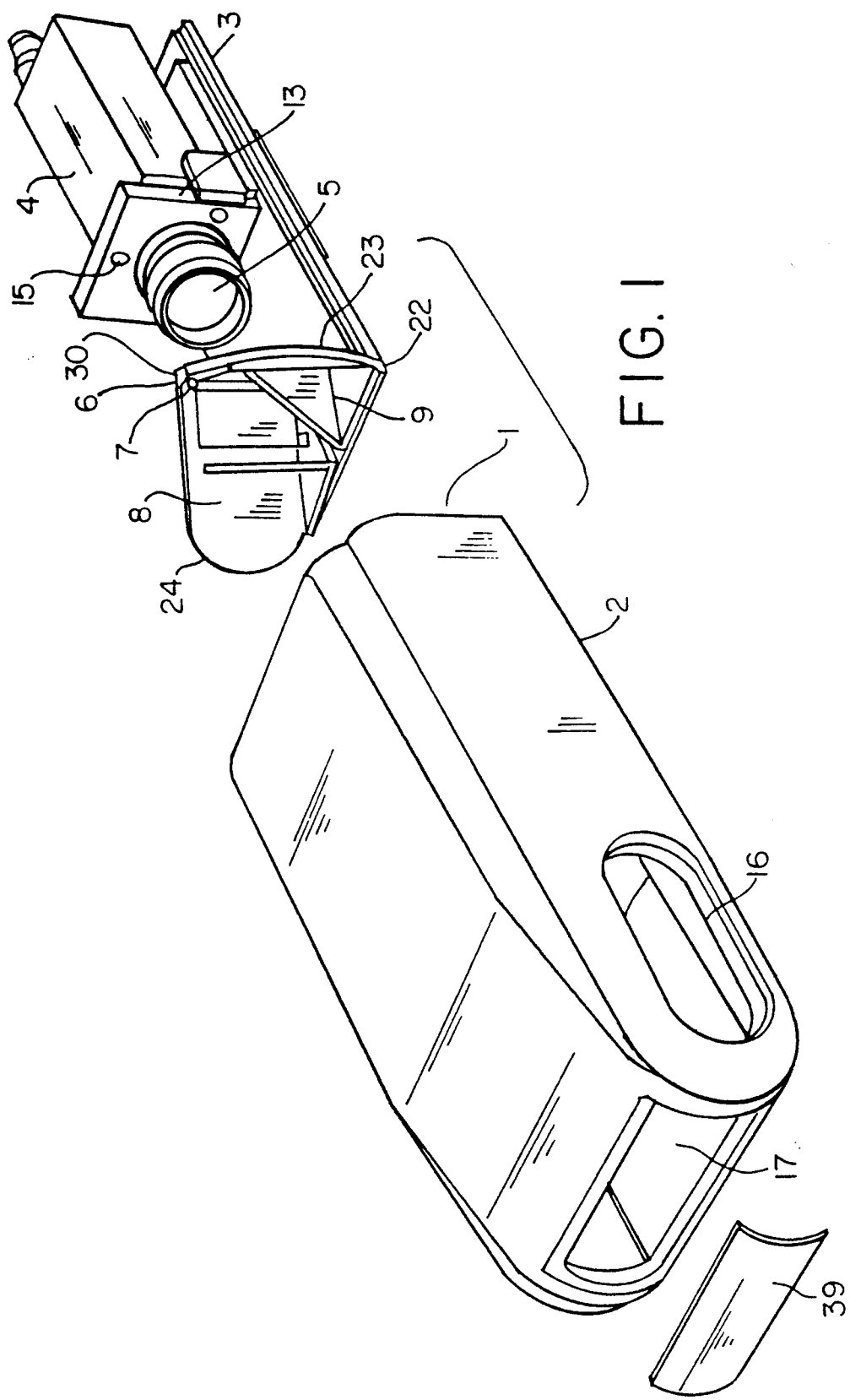
FIG. 1 is a partially exploded perspective view of the image splitter of the present invention.
Figure 2:
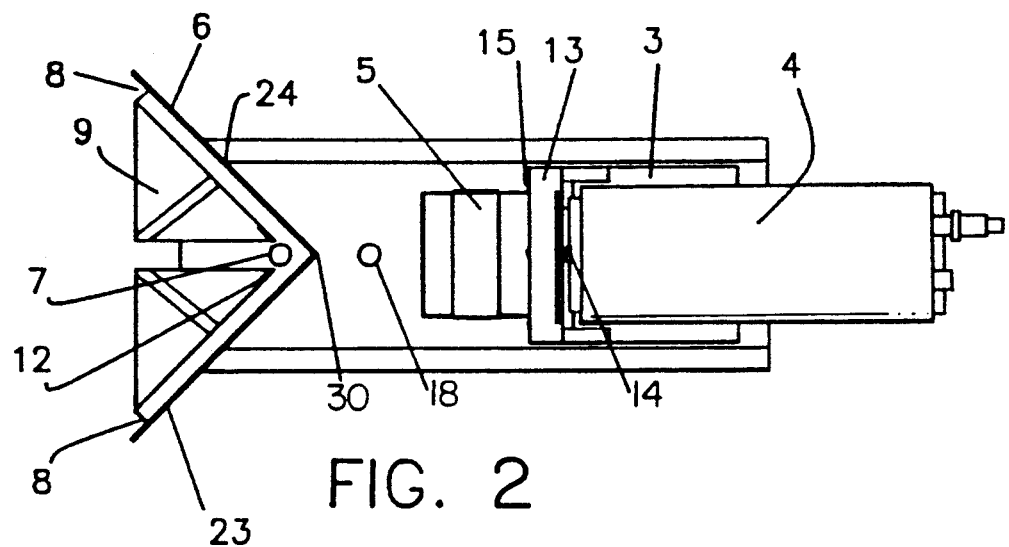
FIG. 2 is a top plan view of the assembled platform of the image splitter of FIG. 1.
Figure 3:
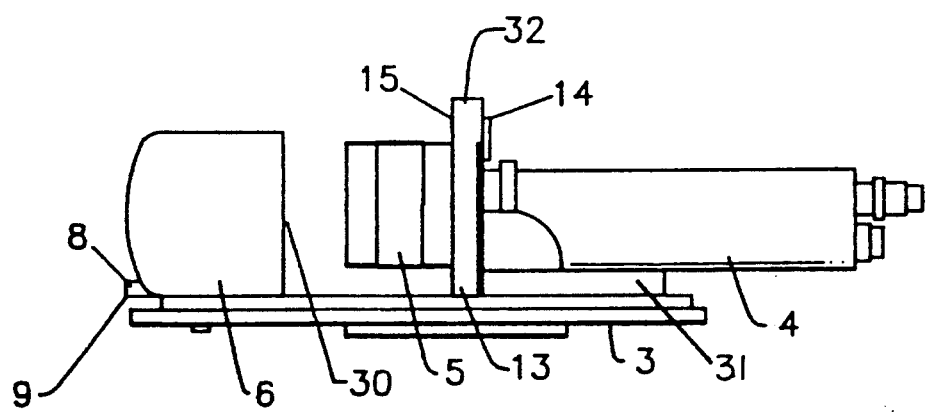
FIG. 3 is a side view of the image splitter of FIG. 1.
Figure 4:
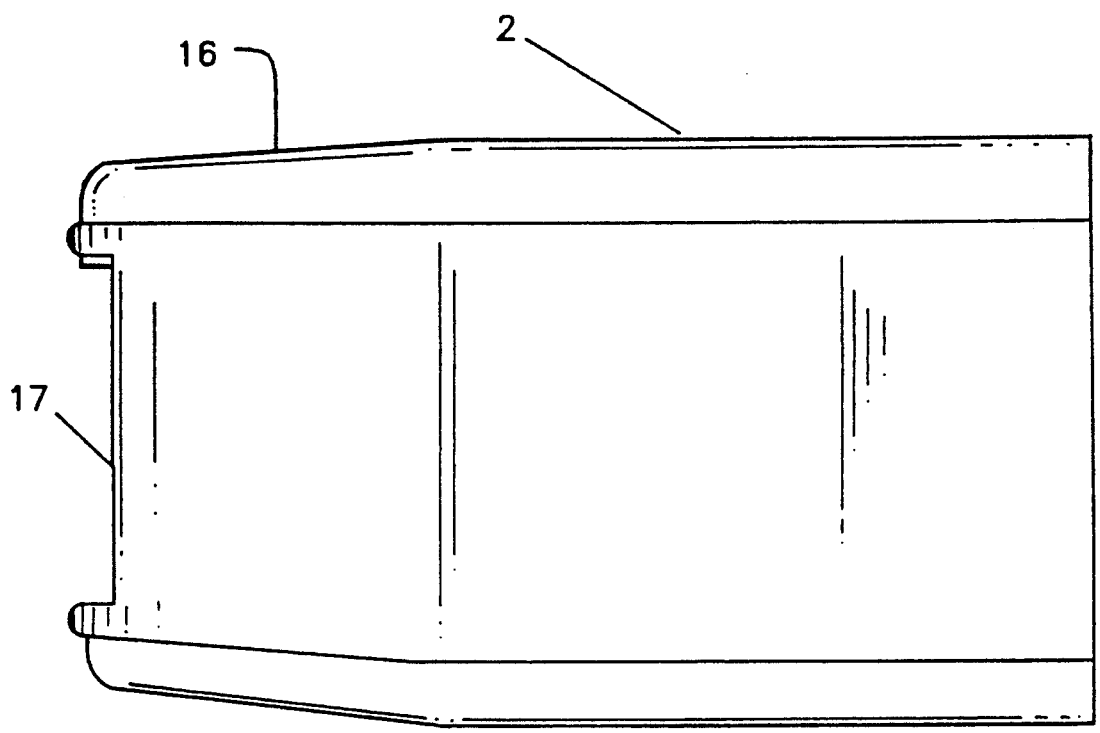
FIG. 4 is a top plan view of the housing of the image splitter of FIG. 1.
Figure 5:
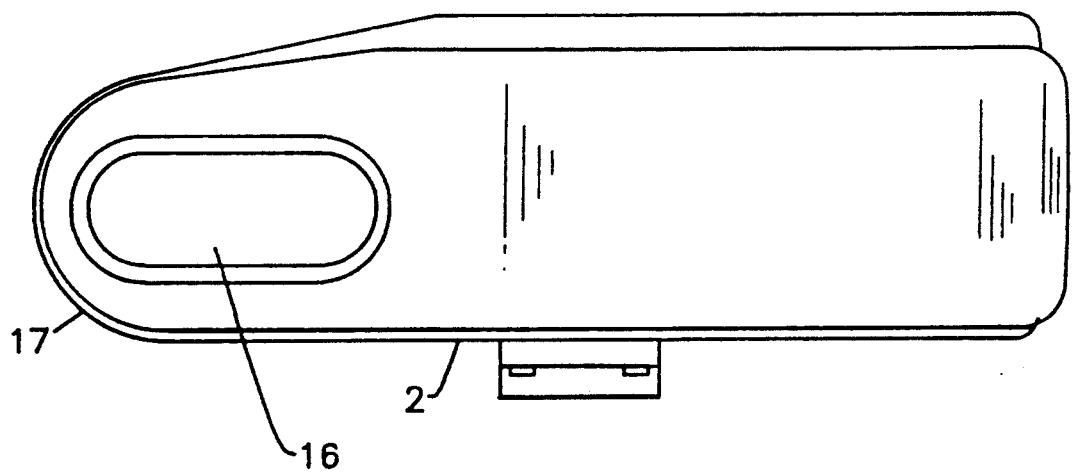
FIG. 5 is a side view of the housing of the image splitter of FIG. 1.

The preferred embodiment of the image splitter 1 of the present invention will now be described in detail. Referring generally to FIGS. 1, 2 and 3, the image splitter 1 comprises a housing 2, a platform 3, and an angled mirror assembly 22 and a camera mounting block 13 mounted on the platform 3. The camera mounting block 13 comprises a television camera 4 and a lens 5. In the preferred embodiment, a CHINON CX-500 CCD type security camera and lens are used, although the image splitter 1 can be designed to accommodate a broad range of security cameras and lenses within the spirit and scope of the invention.

Figure 6:
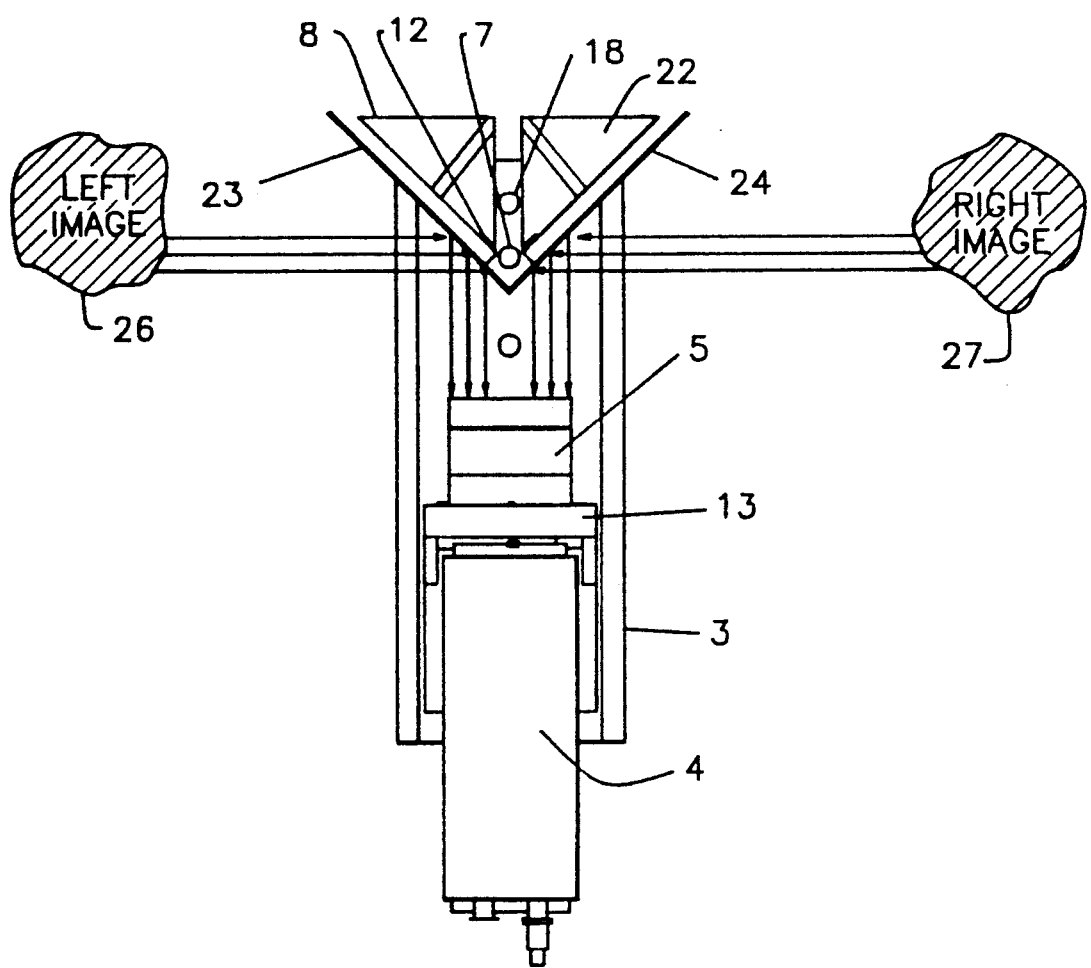
FIG. 6 is a pictorial of the image capture of the image splitter of FIG. 1.
Figure 7:
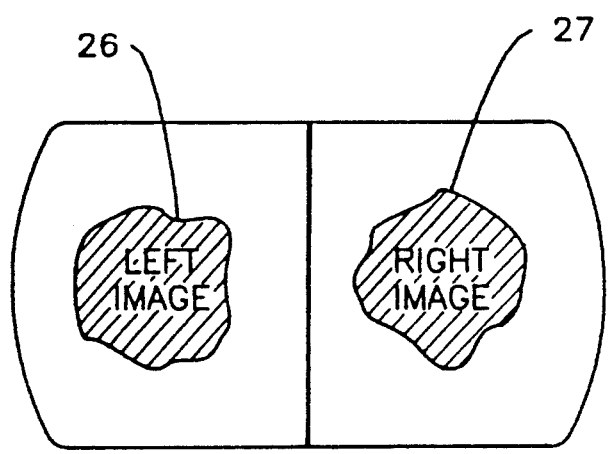
FIG. 7 shows the image captured by the image splitter of FIG. 1, as seen on a television monitor connected thereto.

The angled mirror assembly 22 is mounted on a front end of the platform 3 such that a mirror pair 6 of the mirror assembly 22 faces the camera 4. As can be seen from FIG. 6, the juxtaposition of the camera 4 and the mirror assembly 22 enables a left image 26 and a right image 27 to be captured simultaneously by the camera 4 as a split screen image, which is shown in FIG. 7. The platform 3 is mounted in the housing 2, which provides a window pair 16 so as to allow the left image 26 and the right image 27 to be viewed by the camera 4 via the angled mirror assembly 22.

Figure 9:
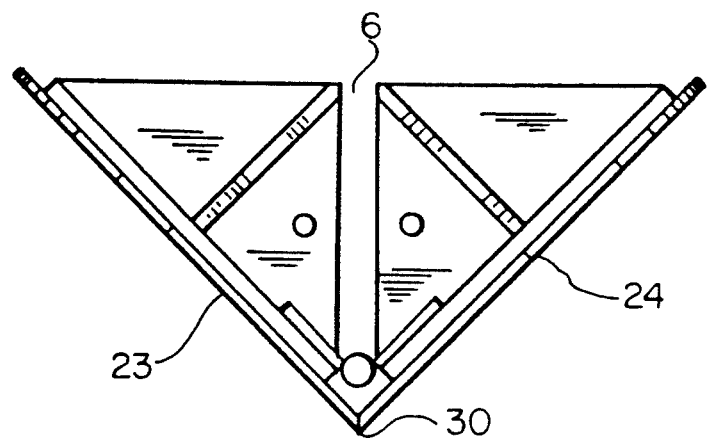
FIG. 9 shows the bevels of the front edges of the mirror pair of the image splitter of FIG. 1.
Figure 9A:
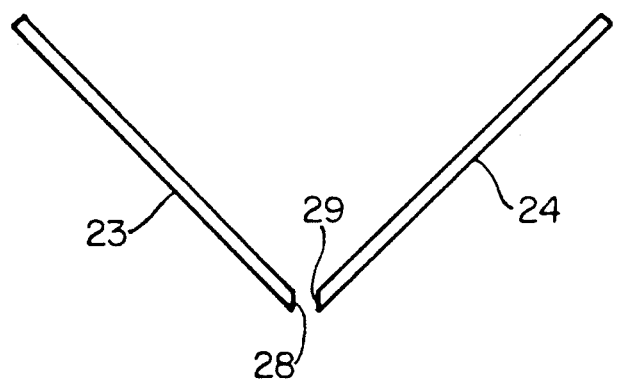
FIG. 9A shows the bevels of the edges on mirrors which are spaced apart.

The pair of shaped metallic mirrors 6 comprises a left mirror 23 and a right mirror 24 which are mounted on the mirror assembly 22. The left mirror 23 and the right mirror 24 are bevelled at their front edges 28 and 29, respectively, as shown in FIG. 9A, in order to form a corner 30 at an angle between approximately 60° and 120°, preferably 90°, to each other as shown in FIG. 9. The mirror pair 6 is attached to a pair of mirror mounting leading edge walls 8, which in turn are held in place by a pair of triangular block assemblies 9. The triangular block assemblies 9 are each joined to opposite sides of a hinge 12. The sleeve of the hinge 12 is inserted over a pin 7, the position of which can be selected by insertion into any of a plurality of holes 18 in the platform 3. Thus, the pin 7 provides location and support for the hinge 12 such that the mirror pair 6 will deliver the left image 26 and the right image 27 to the camera 4.

By bevelling and joining tightly the front edges of the left mirror 23 and the right mirror 24 of the mirror pair 6 to the appropriate angle, as shown in detail in FIG. 9, corner 30 will be formed. This will allow the camera 4 to capture and focus on only the left image 26 and the right image 27 as shown in FIG. 7 and will not be affected by an image of the corner 30 of the mirror pair 6. This functions to maximize the focusing features of the camera 4.

Figure 8:
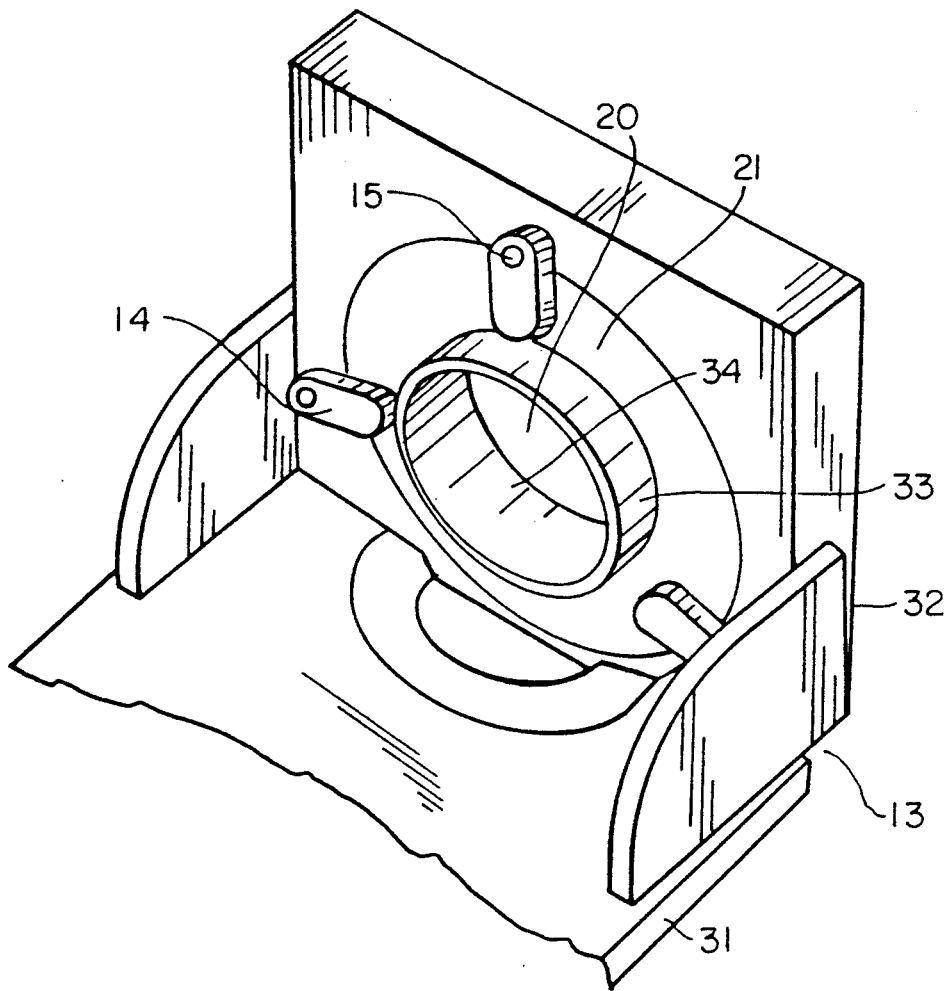
FIG. 8 is a perspective view of the camera mounting assembly of the image splitter of FIG. 1.

The camera 4 is mounted to the platform 3 in the following manner. FIGS. 3 and 8 depict a camera mounting block 13, which is comprised of a flat bottom portion 31 of generally rectangular shape for supporting the camera 4, and a flat front face 32 joined to the bottom portion 31 at a 90° angle. The front face 32 comprises a mounting hole 20, through which a threaded collar 21 is held in place by three tabs 14. The collar 21 comprises two sets of threads; an external set 33 matched to a standard C-mount in size, shape and dimension; and an internal set 34 matched to a lens 5 to be used in the particular installation. The collar 21 is threaded onto the C-mount lens cavity of the camera 4 and is then inserted into the mounting hole 20. The tabs 14 are then installed with associated hold down screws 15 so as to firmly hold the collar 21 within the mounting hole 20. The lens 5 is then threaded onto the opposite side of the collar 21. In this fashion, the camera 4 and lens 5 are securely fastened to the mounting block 13.

The dimensions utilized in the preferred embodiment for the above described manner of mounting the camera 4 are as follows. The front face 32 is approximately 2.16 inches in height, 2.24 inches in width and 0.375 inches thick. The inside diameter of the collar 21 is approximately 1.477 inches, and the outside diameter is approximately 1.737 inches. By securing the camera 4 and the lens 5 to the mounting block 13 in the above described manner, convenient interchangeability of lenses and cameras is obtained.

Figure 10:
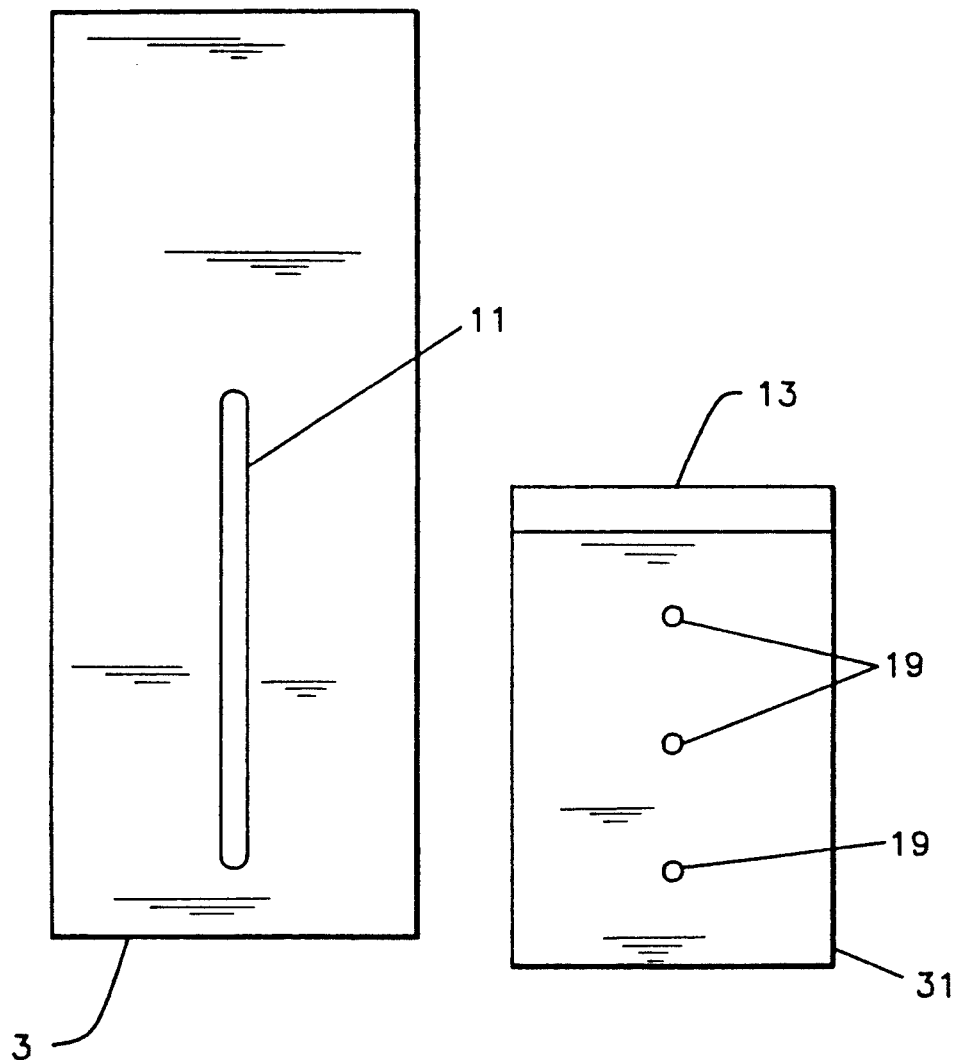
FIG. 10 shows the means of assembling the platform and the camera mounting block of the image splitter of FIG. 1.
Figure 11:
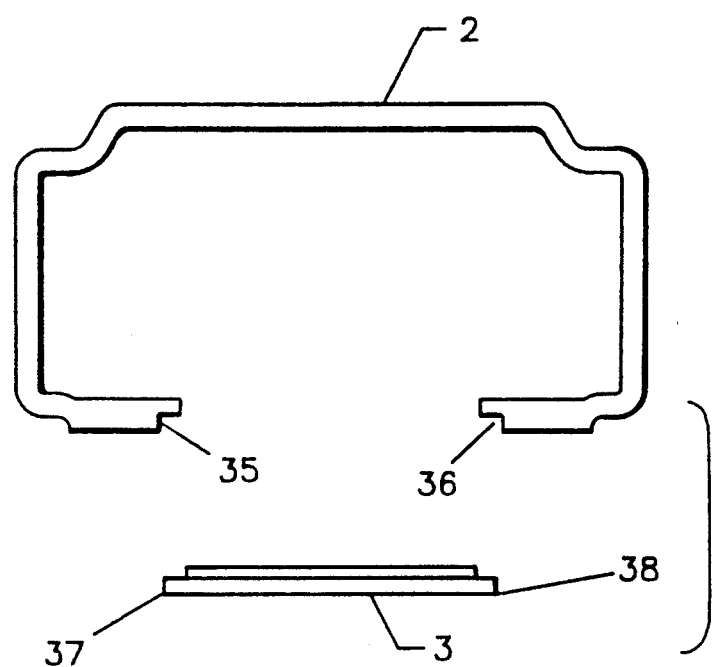
FIG. 11 is a front view showing the platform and housing of the image splitter of FIG. 1.

The platform 3 comprises a groove 11 positioned as shown in FIG. 10. The mounting block 13 is secured to the platform 3 with hold down screws inserted from the underside of the platform 3, through the groove 11, and into threaded holes 19 on the underside of the bottom portion 31. The use of the groove 11 allows the mounting block 13, and therefore the camera 4, to be aligned slidably along the platform 3 as desired. While this manner of mounting the camera 4 is implemented in the preferred embodiment, it is understood that any means known in the art for attaching the camera 4 to the platform 3 or the housing 2 can be used.

Referring to FIGS. 1, 4, 5, and 11, the assembled platform 3 can then be inserted into the housing 2 as follows. The housing 2 is generally rectangular in shape and comprises a window pair 16 located at the front portion thereof. The assembled platform 3 is slidably mounted inside the housing 2 by means of tracks 35 and 36 thereon, which engage flanged edges 37 and 38 of the platform 3, respectively. The platform 3 is then secured to the housing 2 by means by conventional hold down screws. Once secured, the left image 26 and the right image 27 are transmitted through the window pair 16 and reflected by the mirror pair 6 to the lens 5 and the camera 4.

In the preferred embodiment, the length of the housing 2 is approximately 8.625 inches long, the outside width is approximately 5 inches, and the depth at the open end is approximately 2.75 inches. The platform 3 is approximately 3 inches wide and 7.625 inches long.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications and substitutions of parts and elements as fall within the spirit and scope of the appended claims.

We claim:

1. An image splitting optical system an image splitting optical system comprising:
   (a) a platform;
   (b) optical means secured to said platform and disposed thereon to provide simultaneously to a camera a plurality of images; and
   (c) means for securing a camera to said platform and further comprising a housing for enclosing said platform, said housing comprising a pair of windows disposed to enable transmission of images therethrough; and wherein said optical means comprises a pair of mirrors joined at an edge and disposed at an angle between approximately 60° and 120° to each other, said mirrors mounted on a mirror mounting means such that images transmitted through each of said windows of said housing are reflected by said mirrors towards said camera;

and wherein said mirrors are bevelled at said joining edges and fitted together at said joining edge such that no image is generated from the area within and between the respective surfaces thereof and wherein said mirror mounting means comprises a hinged mounting assembly attached to said mirrors, a pin inserted through said hinged mounting assembly and into one of a plurality of alignment holes on said platform, such that said mirror mounting means can be secured to any of a number of fixed positions on said platform and the position thereof can be adjusted as desired.

2. The image splitting optical system of claim 1 wherein said means for securing a camera to a platform comprise a ring threaded on a first side for coupling to the mount of a camera and threaded on a second side for coupling to a lens, and means for attaching said ring to said securing means.

3. The image splitting optical system of claim 2 further comprising a camera and a lens attached to said means for securing a camera.

4. An apparatus for providing a pair of images to a fixed security camera, said apparatus comprising:
 (a) a housing comprising a pair of windows situated on opposite sides thereof;
 (b) a platform slidably engaged within said housing;
 (c) a camera assembly comprising a camera mounting block, a camera and a lens, said camera mounting block comprising a ring threaded on a first side for coupling to the mount of the camera and threaded on a second side for coupling to the lens, and a plurality of tabs for attaching said ring to said mounting block, wherein said camera assembly is slidably mounted along a groove of said platform; and
 (d) an angled mirror assembly comprising a pair of mirrors comprising a left mirror and a right mirror joined at an edge therebetween and disposed at approximately 90° to each other, said mirrors mounted on said angled mirror assembly such that images transmitted through each of said windows of said housing are reflected by said mirrors towards said camera, said mirrors bevelled at a joining edge such that no image is generated from the area within and between the respective surfaces thereof;
whereby a left image incident upon the left mirror is reflected thereby at approximately a 90° angle towards said camera, and a right image incident upon the right mirror is reflected thereby at approximately a 90° angle towards said camera, and the resultant image captured by said camera is composed of a split image of the left image and the right image.

* * * * *